United States Patent
Enomoto et al.

(10) Patent No.: US 8,871,664 B2
(45) Date of Patent: Oct. 28, 2014

(54) REFRACTORY FILLER, SEALING MATERIAL USING SAME, AND MANUFACTURING METHOD FOR REFRACTORY FILLER

(75) Inventors: Tomoko Enomoto, Otsu (JP); Hiroyuki Okamura, Otsu (JP); Nobutoshi Ito, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 98 days.

(21) Appl. No.: 13/695,636

(22) PCT Filed: Apr. 18, 2011

(86) PCT No.: PCT/JP2011/059539
§ 371 (c)(1),
(2), (4) Date: Dec. 28, 2012

(87) PCT Pub. No.: WO2011/142215
PCT Pub. Date: Nov. 17, 2011

(65) Prior Publication Data
US 2013/0125789 A1    May 23, 2013

(30) Foreign Application Priority Data

May 10, 2010 (JP) .................................. 2010-108219
Feb. 7, 2011 (JP) .................................. 2011-023446
Mar. 16, 2011 (JP) .................................. 2011-057320

(51) Int. Cl.
| | | |
|---|---|---|
| C04B 35/16 | (2006.01) | |
| C03C 8/14 | (2006.01) | |
| C09C 1/04 | (2006.01) | |
| C09C 1/40 | (2006.01) | |
| C01B 33/20 | (2006.01) | |
| H01J 9/26 | (2006.01) | |
| H01J 5/20 | (2006.01) | |
| H01J 11/48 | (2012.01) | |
| C09K 3/10 | (2006.01) | |

(52) U.S. Cl.
CPC . *C01B 33/20* (2013.01); *C09C 1/04* (2013.01); *C09K 3/10* (2013.01); *C01P 2004/51* (2013.01); *C09C 1/405* (2013.01); *H01J 9/261* (2013.01); *H01J 2329/867* (2013.01); *C01P 2004/61* (2013.01); *H01J 5/20* (2013.01); *H01J 11/48* (2013.01); *C09C 1/40* (2013.01); *C01P 2006/34* (2013.01)
USPC .................. 501/133; 501/5; 501/15; 501/26; 501/32; 423/326

(58) Field of Classification Search
CPC .... C09C 1/04; C03C 10/0009; C03C 14/004; C03C 8/24
USPC ...................... 501/5, 15, 26, 32, 133; 423/326
See application file for complete search history.

(56) References Cited

U.S. PATENT DOCUMENTS

| | | | | |
|---|---|---|---|---|
| 4,522,925 A | * | 6/1985 | Pirooz .............................. | 501/15 |
| 4,714,687 A | * | 12/1987 | Holleran et al. ................... | 501/9 |
| 2013/0102453 A1 | * | 4/2013 | Enomoto ......................... | 501/15 |

FOREIGN PATENT DOCUMENTS

| | | |
|---|---|---|
| CN | 1379742 A | 11/2002 |
| JP | 63-315536 | 12/1988 |

(Continued)

OTHER PUBLICATIONS

Machine translation of JP 2009155200, Jul. 2009.*

(Continued)

*Primary Examiner* — Karl Group
(74) *Attorney, Agent, or Firm* — Wenderoth, Lind & Ponack, L.L.P.

(57) ABSTRACT

Provided is a manufacturing method for a refractory filler, comprising melting a raw material batch and cooling the resultant melt to precipitate willemite as a main crystal phase.

9 Claims, 1 Drawing Sheet

(56) References Cited

FOREIGN PATENT DOCUMENTS

| | | | |
|---|---|---|---|
| JP | 01-252549 | | 10/1989 |
| JP | 02-133336 | | 5/1990 |
| JP | 04-114930 | | 4/1992 |
| JP | 08-059294 | | 3/1996 |
| JP | 11-228173 | | 8/1999 |
| JP | 2007-332018 | | 12/2007 |
| JP | 2009-155200 | | 7/2009 |
| JP | 2011225402 | * | 11/2011 |
| JP | 2012193062 | * | 10/2012 |
| KR | 2003012501 | * | 2/2003 |
| KR | 10-2009-0037915 | | 4/2009 |
| WO | 01/28943 A1 | | 4/2001 |

OTHER PUBLICATIONS

International Preliminary Report on Patentability and Written Opinion of the International Searching Authority issued Dec. 20, 2012 in International(PCT) Application No. PCT/JP2011/059539.

International Search Report issued Jun. 7, 2011 in International (PCT) Application No. PCT/JP2011/059539.

E. N. Bunting, "Phase Equilibria in the System $SiO_2$—$ZnO$—$Al_2O_3$," Bur. Stand. J. Res., vol. 8, No. 2, p. 279-287; 1932.

Chinese Office Action issued Jun. 3, 2014 in corresponding Chinese Application No. 201180023136.9 (with partial English translation).

* cited by examiner

REFRACTORY FILLER, SEALING MATERIAL USING SAME, AND MANUFACTURING METHOD FOR REFRACTORY FILLER

TECHNICAL FIELD

The present invention relates to a refractory filler and a manufacturing method for a refractory filler, and more specifically, to a refractory filler and a manufacturing method for a refractory filler to be used in a sealing material for a display device such as a plasma display panel (hereinafter, PDP), an OLED display, a field emission display (hereinafter, FED), or a vacuum fluorescent display (hereinafter, VFD), or a sealing material for an electronic component such as a piezoelectric vibrator package or an IC package.

BACKGROUND ART

As a sealing material, there is used a composite powder material comprising glass powder and a refractory filler. This sealing material is excellent in chemical durability and heat resistance and suitable for securing airtightness as compared to a resin-based adhesive.

Conventionally, $PbO$—$B_2O_3$-based glass has been used as the glass powder (see, for example, Patent Literature 1). However, from an environmental view, a demand for removal of PbO from a glass composition has led to development of $Bi_2O_3$—$B_2O_3$-based glass. Patent Literature 2 or the like discloses that the $Bi_2O_3$—$B_2O_3$-based glass has a low melting point and has chemical durability comparable to that of the $PbO$—$B_2O_3$-based glass.

There can be achieved a decrease in thermal expansion coefficient and an improvement in mechanical strength through use of the refractory filler. Conventionally, lead titanate or the like having low expansion has been used as the refractory filler. However, as with the glass powder, the refractory filler is demanded to have a composition from which PbO has been removed. Accordingly, as the refractory filler, there has been considered use of willemite, cordierite, tin dioxide, β-eucryptite, mullite, silica, β-quartz solid solution, aluminum titanate, zircon, and the like. Of those, willemite has low expansion and satisfactory compatibility with the $Bi_2O_3$—$B_2O_3$-based glass (hardly devitrifies the $Bi_2O_3$—$B_2O_3$-based glass at the time of sealing), and hence has attracted attention (see Patent Literature 3 and Non Patent Literature 1).

CITATION LIST

Patent Literature 1: JP 63-315536 A
Patent Literature 2: JP 08-59294 A
Patent Literature 3: JP 04-114930 A
Non Patent Literature 1: E. N. Bunting, "Phase Equilibria in the system SiO2-ZnO—Al2O3," Bur. Stand. J. Res., vol. 8, No. 2, p. 279-287; 1932

SUMMARY OF INVENTION

Technical Problem

A refractory filler such as willemite is generally produced by a solid phase reaction method. When willemite is produced by the solid phase reaction method, it is necessary to fire a raw material batch at a temperature around its melting point (about 1,510° C.; see Non Patent Literature 1), specifically 1,440° C. or more, for a long period of time in order to complete the solid phase reaction. Accordingly, when the firing temperature is excessively high, the fusion of the fired product is liable to occur at the time of firing. As a result, the pulverization efficiency of the fired product significantly lowers, and hence the manufacturing cost of the refractory filler soars.

On the other hand, when the firing temperature is excessively low, part of the raw material is liable to be left unreacted. If an unreacted raw material remains in the refractory filler as described above, when the filler is complexed with glass powder and used as a sealing material or the like, an unintended crystal is liable to precipitate in the glass, and hence a defect in sealing is liable to occur.

Further, as described above, the refractory filler has an effect of lowering the thermal expansion coefficient of a sealing material or the like. Accordingly, in the case where the effect of lowering the thermal expansion coefficient is large, even if the content ratio of the refractory filler is decreased in the sealing material or the like, a desired thermal expansion coefficient may be obtained. As a result of the decrease in the content ratio of the refractory filler, the content ratio of the glass powder contained in the sealing material or the like increases, which allows the sealing material or the like to have enhanced flowability. On the other hand, in the case where the effect of lowering the thermal expansion coefficient is small, if the content ratio of the refractory filler is decreased in the sealing material or the like, the desired thermal expansion coefficient is difficult to obtain.

In view of the above-mentioned circumstances, a technical object of the present invention is to provide a refractory filler, which can be manufactured at a reduced cost, in which a situation in which part of a raw material remains unreacted can be surely prevented, and which can appropriately lower the thermal expansion coefficient of a sealing material or the like.

Solution to Problem

A manufacturing method for a refractory filler according to a first invention, which has been invented to achieve the technical object, comprises melting a raw material batch and cooling the resultant melt to precipitate willemite as a main crystal (crystal in the largest precipitation amount) phase.

The manufacturing method for a refractory filler comprises melting a raw material batch. With this, a period of time required for a reaction of the raw material batch can be reduced, and hence the manufacturing cost of the refractory filler can be reduced. Further, with this, the raw material hardly remains unreacted, and hence the composition of the refractory filler is easily made uniform.

Further, the manufacturing method for a refractory filler comprises cooling the melt. With this, it is possible to precipitate a crystal at the time of the cooling, and hence the manufacturing cost of the refractory filler can be reduced.

In addition, the manufacturing method for a refractory filler comprises precipitating willemite as a main crystal. With this, an effect of lowering a thermal expansion coefficient increases, and hence a situation in which a sealing portion or the like breaks owing to thermal stress is easily prevented. It should be noted that the use of a predetermined raw material batch allows willemite and the like to be precipitated as a main crystal phase at the time of the cooling.

In this context, when the refractory filler has low crystallinity, a heat treatment step at 800° C. or more may be provided after the cooling to enhance the crystallinity of the refractory filler. However, in the manufacturing method for a refractory filler according to the first invention, from the viewpoint of achieving an additional reduction in the manufacturing cost of the refractory filler, a sufficient amount of a crystal is preferably precipitated at the time of the cooling to omit such heat treatment step.

Second, in the manufacturing method for a refractory filler according to the first invention, it is preferred that the cooling of the melt comprise pouring the melt between forming rollers. With this, the melt can be formed into a film shape. Hence, the refractory filler is easily made into fine particles and the particle size of the refractory filler is easily adjusted. As a result, the manufacturing cost of the refractory filler can be easily reduced. In addition, it is also possible to precipitate a willemite crystal at the time of the cooling.

Third, in the manufacturing method for a refractory filler according to the first invention, it is preferred that the cooling of the melt comprise pouring the melt into water. With this, the melt is formed into a crushed shape at the time of the cooling and a large number of cracks occur in the formed product. Hence, the refractory filler is easily made into fine particles and the particle size of the refractory filler is easily adjusted. As a result, the manufacturing cost of the refractory filler can be easily reduced. In addition, it is also possible to precipitate a willemite crystal at the time of the cooling.

Fourth, in the manufacturing method for a refractory filler according to the first invention, it is preferred that the refractory filler further comprise preparing the raw material batch so that the refractory filler comprises, as a composition in terms of mol %, 50 to 80% of ZnO, 10 to 40% of $SiO_2$, and 0 to 10% of $Al_2O_3$. With this, willemite and the like are easily precipitated as a main crystal phase at the time of the cooling, and hence the manufacturing cost of the refractory filler can be easily reduced.

Fifth, in the manufacturing method for a refractory filler according to the first invention, it is preferred that the raw material batch have an average particle diameter $D_{50}$ of less than 20 μm. With this, a case where a raw material is not dissolved or the melt is made inhomogeneous owing to a difference in density between raw materials is easily prevented. As used herein, the term "average particle diameter $D_{50}$" refers to a value measured by a laser diffraction method, and refers to the particle diameter of a particle in which, in a cumulative particle size distribution curve on a volumetric basis when measured by the laser diffraction method, the integrated quantity thereof is 50% when accumulated in the order starting from the particle having the smallest particle diameter.

Sixth, in the manufacturing method for a refractory filler according to the first invention, it is preferred that the raw material batch have a maximum particle diameter $D_{max}$ of less than 100 μm. With this, a case where a raw material is not dissolved or the melt is made inhomogeneous owing to a difference in density between raw materials is easily prevented. As used herein, the term "maximum particle diameter $D_{max}$" refers to a value measured by a laser diffraction method, and refers to the particle diameter of a particle in which, in a cumulative particle size distribution curve on a volumetric basis when measured by the laser diffraction method, the integrated quantity thereof is 99% when accumulated in the order starting from the particle having the smallest particle diameter.

Seventh, in the manufacturing method for a refractory filler according to the first invention, it is preferred that the willemite and gahnite be precipitated as the main crystal phase. With this, an effect of improving mechanical strength is larger than in the case where the main crystal phase comprises only willemite. Hence, the breakage of a sealing por-tion or the like is easily prevented, and thus the airtightness of a display device or the like is easily maintained.

Eighth, in the manufacturing method for a refractory filler according to the first invention, it is preferred that the ratio of the willemite to the gahnite fall within the range of 100:0 to 70:30 in terms of molar ratio.

Ninth, a refractory filler according to the first invention is produced by the above-mentioned manufacturing method.

Tenth, a refractory filler according to the first invention is a refractory filler having willemite precipitated therein as a main crystal, which is produced by melting a raw material batch and cooling the resultant melt.

Eleventh, a sealing material according to the first invention is a sealing material comprising glass powder and a refractory filler, wherein at least part of the refractory filler comprises the above-mentioned refractory filler.

Further, a refractory filler according to a second invention, which has been invented to achieve the object, is a refractory filler having willemite precipitated therein as a main crystal (crystal in the largest precipitation amount), the refractory filler comprising, as a composition in terms of mol %, 50 to 80% of ZnO, 10 to 40% of $SiO_2$, and 0.1 to 10% of $Al_2O_3$, wherein the refractory filler has a ratio of the willemite to an Al-based crystal of 100:0 to 99:1 in terms of molar ratio. As used herein, the term "Al-based crystal" refers to a crystal comprising Al as a crystal constituent (e.g., gahnite).

The refractory filler comprises 50 to 80 mol % of ZnO and 10 to 40 mol % of $SiO_2$ in its composition. With this, willemite easily precipitates as a main crystal to increase an effect of lowering a thermal expansion coefficient. Further, the refractory filler of the present invention comprises 0.1 mol % or more of $Al_2O_3$ in its composition. With this, the refractory filler can be produced at a temperature lower than a conventional one. Accordingly, a situation in which an unreacted raw material remains in the refractory filler is prevented and a reduction in manufacturing cost can be surely achieved. In addition, the refractory filler of the present invention comprises 10 mol % or less of $Al_2O_3$ in its composition. With this, the precipitation amount of the Al-based crystal is easily suppressed.

The refractory filler has willemite precipitated therein as a main crystal and has a ratio of the willemite to the Al-based crystal of 100:0 to 99:1 in terms of molar ratio. When willemite is precipitated as a main crystal and the precipitation amount of the Al-based crystal is small, the effect of lowering the thermal expansion coefficient of a sealing material or the like is easily provided. Therefore, the thermal expansion coefficient of a sealing material or the like can be appropriately lowered.

Second, in the refractory filler according to the second invention, when the Al-based crystal is precipitated, the Al-based crystal preferably comprises gahnite. When gahnite is precipitated in the same particle as willemite, an effect of improving mechanical strength increases. As a result, the breakage of a sealing portion or the like is easily prevented, and thus the airtightness of a display device or the like is easily maintained.

Third, the refractory filler according to the second invention is preferably produced by melting a raw material batch and cooling the resultant melt, i.e., produced by a melting method. The melting of the raw material batch can reduce a period of time required for a reaction of the raw material batch, and hence the manufacturing cost of the refractory filler can be reduced. Further, with this, the raw material hardly remains unreacted, and hence the composition of the refractory filler is easily made uniform. In addition, the cooling of the resultant melt allows a crystal to be precipitated at the time of the cooling, and hence the manufacturing cost of the refractory filler can be reduced.

Fourth, a sealing material according to the second invention is a sealing material comprising glass powder and a refractory filler, wherein at least part of the refractory filler comprises the above-mentioned refractory filler.

DESCRIPTION OF EMBODIMENTS

Figure 1:
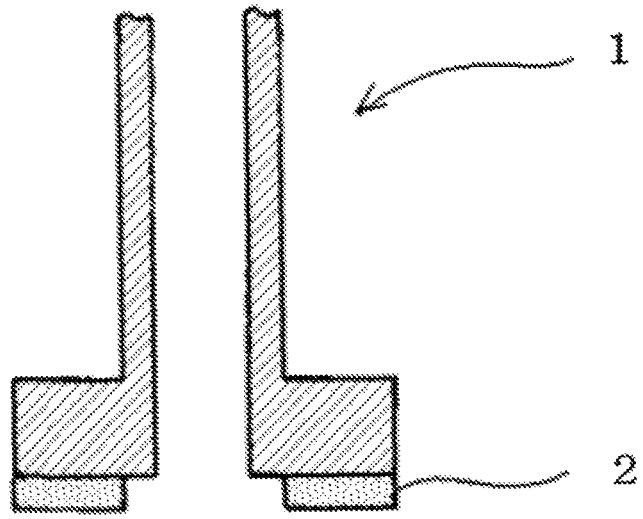
FIG. 1 A cross-sectional conceptual view illustrating a mode of a tablet-integrated exhaust pipe.

A first embodiment of the present invention is described. A manufacturing method for a refractory filler according to the first embodiment comprises melting a raw material batch and cooling the resultant melt to precipitate willemite as a main crystal phase. In the manufacturing method for a refractory filler, as a method for the cooling of the melt, any of various methods may be adopted. For example, a method comprising pouring the melt between forming rollers, or a method comprising pouring the melt into water is suitable. According to the former method, the melt can be formed into a film shape, and hence the formed product is easily pulverized. As a result, the refractory filler is easily made into fine particles and the particle size thereof is easily adjusted. In addition, it is also possible to precipitate a willemite crystal at the time of the cooling. On the other hand, according to the latter method, the melt is formed into a crushed shape at the time of the cooling and a large number of cracks occur in the formed product, and hence the formed product is easily pulverized. Accordingly, the refractory filler is easily made into fine particles and the particle size thereof is easily adjusted. In addition, it is also possible to precipitate a willemite crystal at the time of the cooling.

In the manufacturing method for a refractory filler, it is preferred to prepare a raw material batch so that the refractory filler comprises, in terms of mol %, 60 to 79.9% (preferably 63 to 70%) of ZnO, 20 to 39.9% (preferably 28 to 35%) of $SiO_2$, and 0 to 10% of $Al_2O_3$. A batch composition for the raw material batch also preferably comprises, in terms of mol %, 60 to 79.9% (preferably 63 to 70%) of ZnO, 20 to 39.9% (preferably 28 to 35%) of $SiO_2$, and 0 to 10% of $Al_2O_3$. ZnO and $SiO_2$ are constituent components of a crystal. $Al_2O_3$ is a constituent component of a crystal and is also a component that lowers the melting point of the melt through the addition of the component in a small amount. It should be noted that, when gahnite is precipitated as a main crystal phase, the content of $Al_2O_3$ is preferably 0.1 mol % or more, 1 mol % or more, particularly preferably 3 mol % or more. When the content of $Al_2O_3$ is less than 0.1 mol %, gahnite hardly precipitates and an effect of lowering the melting point of the melt is poor. On the other hand, when the content of $Al_2O_3$ is excessively large, the formed product is liable to vitrify, and hence willemite is difficult to precipitate. Further, the melt loses its component balance, and hence the melting point of the melt is liable to increase to the worse to make it difficult to melt the raw material batch.

The manufacturing method for a refractory filler preferably uses a raw material batch substantially free of PbO. With this, environmental requirements in recent years can be achieved. As used herein, the phrase "substantially free of PbO" refers to a case where the content of PbO is 1,000 ppm (by mass) or less.

In the manufacturing method for a refractory filler, the raw material batch preferably has an average particle diameter $D_{50}$ of less than 20 μm. In the production of the refractory filler of the present invention, when a ZnO raw material and an $SiO_2$ raw material are used, a difference in density between raw materials increases. In this case, when the average particle diameter $D_{50}$ of the raw material batch is excessively large, owing to the difference in density between raw materials, ZnO is liable to be deposited or $SiO_2$ is liable to be suspended. Accordingly, a homogeneous melt is difficult to obtain, and hence the composition of the refractory filler is liable to be nonuniform. It should be noted that the ZnO raw material has a density of 5.6 $g/cm^3$ and the $SiO_2$ raw material has a density of 2.6 $g/cm^3$.

In the manufacturing method for a refractory filler, the raw material batch preferably has a maximum particle diameter $D_{max}$ of less than 100 μm. As described above, in the production of the refractory filler of the present invention, when a ZnO raw material and an $SiO_2$ raw material are used, a difference in density between raw materials increases. In this case, when the maximum particle diameter $D_{max}$ of the raw material batch is excessively large, owing to the difference in density between raw materials, ZnO is liable to be deposited or $SiO_2$ is liable to be suspended. Accordingly, a homogeneous melt is difficult to obtain, and hence the composition of the refractory filler is liable to be nonuniform.

In the manufacturing method for a refractory filler, willemite and gahnite are preferably precipitated as a main crystal phase. In the case where willemite and gahnite are precipitated in the same particle, an effect of improving mechanical strength is larger than in the case where the main crystal phase comprises only willemite. As a result, the breakage of a sealing portion or the like is easily prevented, and the airtightness of a display device or the like is easily maintained. Further, the precipitation of willemite allows an effect of lowering a thermal expansion coefficient to be provided certainly.

In the manufacturing method for a refractory filler, a precipitation ratio "willemite:gahnite" of willemite to gahnite is adjusted to preferably 99:1 to 70:30, 95:5 to 80:20, particularly preferably 95:5 to 90:10 in terms of molar ratio. When the ratio of gahnite is small, the effect of enhancing mechanical strength is poor. On the other hand, when the ratio of gahnite is excessively large, the effect of lowering a thermal expansion coefficient is poor.

The manufacturing method for a refractory filler preferably comprises the steps of pulverizing and classifying a formed product so as to have an average particle diameter $D_{50}$ of 20 μm or less, particularly 2 to 15 μm. With this, a sealing thickness is easily made small. It should be noted that, in order to allow an effect of the refractory filler to be provided certainly, the average particle diameter $D_{50}$ of the refractory filler is preferably 0.5 μm or more.

The manufacturing method for a refractory filler preferably comprises the steps of pulverizing and classifying a formed product so as to have a maximum particle diameter $D_{max}$ of 100 μm or less, particularly 10 to 75 μm. With this, a glazed surface is easily made smooth and a sealing thickness is easily made small.

As a pulverization method (apparatus), there may be utilized a ball mill, a jaw crusher, a jet mill, a disc mill, a spectro mill, a grinder, a mixer mill, or the like. Of those, a ball mill is preferred from the viewpoints of a running cost and pulverization efficiency.

A refractory filler according to the first embodiment of the present invention is produced by the above-mentioned method. Further, the refractory filler of the present invention is preferably substantially free of PbO for the above-mentioned reason.

The refractory filler is preferably complexed with glass powder and used as a sealing material. That is, a sealing material according to the first embodiment of the present invention is a sealing material comprising glass powder and a refractory filler, in which the whole or part of the refractory filler comprises the refractory filler manufactured by the above-mentioned method. The content of the refractory filler in the sealing material is preferably 0.1 to 70 vol %, 15 to 50 vol %, particularly preferably 20 to 40 vol %. When the content of the refractory filler is more than 70 vol %, the content of the glass powder is relatively small, and hence the flowability of the sealing material lowers. As a result, sealing strength is liable to lower. On the other hand, when the content of the refractory filler is less than 0.1 vol %, the effect of the refractory filler is poor. It should be noted that the sealing material may further comprise, as a refractory filler, for example, one kind or two or more kinds selected from cordierite, zircon, β-eucryptite, quartz glass, alumina, mullite, zirconium tungstate phosphate, zirconium tungstate, and alumina-silica-based ceramics in addition to the refractory filler produced by the above-mentioned method. Those refractory fillers are useful from the viewpoints of adjusting a thermal expansion coefficient, adjusting flowability, and improving mechanical strength. Further, the content of those refractory fillers is preferably 0 to 30 vol %, particularly preferably 0 to 10 vol % in total.

As the glass powder, any of various glass powders may be used. For example, $Bi_2O_3$—$B_2O_3$—ZnO-based glass, $V_2O_5$—$P_2O_5$-based glass, or SnO—$P_2O_5$-based glass is suitable in view of a low melting point characteristic, and $Bi_2O_3$—$B_2O_3$—ZnO-based glass is particularly preferred in view of thermal stability and water resistance. As used herein, the term "-based glass" refers to glass which comprises the specified components as essential components and in which the total content of the specified components is 30 mol % or more, preferably 40 mol % or more, more preferably 50 mol % or more. It should be noted that the glass composition of the glass powder is preferably substantially free of PbO from an environmental point of view.

The $Bi_2O_3$—$B_2O_3$—ZnO-based glass preferably comprises, as a glass composition in terms of mol %, 30 to 60% of $Bi_2O_3$, 10 to 35% of $B_2O_3$, and 1 to 35% of ZnO. The reasons why the content range of each component is limited as described above are described below. It should be noted that, in the description of the glass composition range, the expression "%" means "mol %."

$Bi_2O_3$ is a main component for lowering a softening point, and its content is preferably 30 to 60%, 36 to 55%, particularly preferably 37 to 52%. When the content of $Bi_2O_3$ is excessively small, the softening point becomes excessively high and hence flowability is liable to lower. On the other hand, when the content of $Bi_2O_3$ is excessively large, the glass is liable to devitrify at the time of firing, and owing to the denitrification, the flowability is liable to lower.

$B_2O_3$ is an essential component as a glass-forming component, and its content is preferably 10 to 35%, 15 to 30%, particularly preferably 18 to 28%. When the content of $B_2O_3$ is excessively small, a glass network is hardly formed, and hence the glass is liable to devitrify at the time of firing. On the other hand, when the content of $B_2O_3$ is excessively large, the glass has an increased viscosity, and hence the flowability is liable to lower.

ZnO is a component that enhances devitrification resistance, and its content is preferably 1 to 35%, 5 to 30%, 10 to 25%, particularly preferably 13 to 25%. When the content is less than 1%, or more than 35%, the glass composition loses its component balance, and hence the devitrification resistance is liable to lower.

In addition to the above-mentioned components, for example, the following components may be added.

$SiO_2$ is a component that enhances water resistance, while having an action of increasing the softening point. Accordingly, the content of $SiO_2$ is preferably 0 to 4%, 0 to 3%, 0 to 2%, particularly preferably 0 to 1%. Further, when the content of $SiO_2$ is excessively large, the glass is liable to devitrify at the time of firing.

CuO+$Fe_2O_3$ (total content of CuO and $Fe_2O_3$) is a component that enhances the devitrification resistance, and its content is preferably 0 to 25%, 0.01 to 10%, particularly preferably 0.1 to 10%. In order to lower the softening point of $Bi_2O_3$—$B_2O_3$—ZnO-based glass, it is necessary to introduce a large amount of $Bi_2O_3$ into the glass composition, but when the content of $Bi_2O_3$ is increased, the glass is liable to devitrify at the time of firing, and owing to the devitrification, the flowability is liable to lower. This tendency is particularly remarkable when the content of $Bi_2O_3$ is 30% or more. As a countermeasure for this problem, the addition of an appropriate amount of CuO+$Fe_2O_3$ can effectively suppress the devitrification of the glass even when the content of $Bi_2O_3$ is 30% or more. It should be noted that, when the content of CuO+$Fe_2O_3$ is excessively large, the glass composition loses its component balance, and hence the devitrification resistance is liable to lower to the worse.

CuO is a component that enhances the devitrification resistance, and its content is preferably 0 to 15%, particularly preferably 0.1 to 10%. When the content of CuO is excessively large, the glass composition loses its component balance, and hence the devitrification resistance is liable to lower to the worse.

$Fe_2O_3$ is a component that enhances the devitrification resistance, and its content is preferably 0 to 10%, 0.1 to 10%, particularly preferably 0.3 to 5%. When the content of $Fe_2O_3$ is excessively large, the glass composition loses its component balance, and hence the devitrification resistance is liable to lower to the worse.

BaO is a component that enhances the devitrification resistance. The content of BaO is preferably 0 to 12%, particularly preferably 1 to 8%. When the content of BaO is excessively large, the glass composition loses its component balance, and hence the glass loses its thermal stability to the worse, with the result that the glass is liable to denitrify. It should be noted that the control of the content of BaO to 1 to 8% can remarkably enhance the thermal stability of the glass.

$Al_2O_3$ is a component that enhances the water resistance, and its content is preferably 0 to 10%, 0 to 5%, particularly preferably 0 to 2%. When the content of $Al_2O_3$ is excessively large, the softening point has a risk of inappropriately increasing.

$Sb_2O_3$ is a component that enhances the devitrification resistance, and its content is preferably 0 to 5%, particularly preferably 0.1 to 2%. When the content of $Sb_2O_3$ is excessively large, the glass composition loses its component balance, and hence the devitrification resistance is liable to lower to the worse.

The glass powder preferably has an average particle diameter $D_{50}$ of less than 15 μm, 0.5 to 10 μm, particularly preferably 1 to 5 μm. As the average particle diameter $D_{50}$ of the glass powder is smaller, the softening point of the glass powder lowers.

The sealing material may be used in a powdery state, but is preferably formed into a paste by being uniformly kneaded with a vehicle from the viewpoint of improving handleability.

The vehicle generally comprises a solvent and a resin. The resin is added for the purpose of adjusting the viscosity of the paste. Further, a surfactant, a thickener, or the like may also be added thereto as required. The produced paste is applied onto a surface of an object to be sealed by means of a coating machine such as a dispenser or a screen printing machine.

As the resin, there may be used an acrylic acid ester (acrylic resin), ethylcellulose, a polyethylene glycol derivative, nitrocellulose, polymethylstyrene, polyethylene carbonate, a methacrylic acid ester, and the like. In particular, an acrylic acid ester and nitrocellulose are preferred because of good thermolytic property.

As the solvent, there may be used N,N'-dimethyl formamide (DMF), α-terpineol, a higher alcohol, γ-butyrolactone (γ-BL), tetralin, butylcarbitol acetate, ethyl acetate, isoamyl acetate, diethylene glycolmonoethyl ether, diethylene glycolmonoethyl ether acetate, benzyl alcohol, toluene, 3-methoxy-3-methylbutanol, water, triethylene glycol monomethyl ether, triethylene glycol dimethyl ether, dipropylene glycol monomethyl ether, dipropylene glycol monobutyl ether, tripropylene glycol monomethyl ether, tripropylene glycol monobutyl ether, propylene carbonate, dimethyl sulfoxide (DMSO), N-methyl-2-pyrrolidone, and the like. In particular, α-terpineol is preferred because of high viscosity and good solubility of a resin and the like.

The sealing material of the present invention is preferably used after being sintered into a tablet having a predetermined shape. For the sealing of an exhaust pipe of a PDP or the like, a tablet formed into a ring shape (also referred to as, for example, press frit/sintered glass body/formed glass body) is used. The tablet has formed therein an insertion hole for the insertion of the exhaust pipe, and the exhaust pipe is inserted into the insertion hole. In addition, the forward end portion of the exhaust pipe is positioned at an exhaust hole of the panel and fixed thereto with a clip or the like. After that, the tablet is softened in the secondary firing step (sealing step) to attach the exhaust pipe to the panel. When the sealing material is processed into a tablet, upon attachment of the exhaust pipe, the exhaust pipe is easily connected to an exhaust system and the slanting of the exhaust pipe is reduced. In addition, the attachment is easily performed so as to keep reliability in airtightness while maintaining the ability of the PDP or the like to emit light.

The tablet is produced through a plurality of times of heat treatment. First, a resin and a solvent are added to the sealing material to prepare a slurry. After that, the slurry is loaded into a granulation apparatus such as a spray dryer to produce granules. At this time, the granules are dried at a temperature at which the solvent is volatilized (about 100 to 200° C.). In addition, the produced granules are loaded into a mold designed to have predetermined dimensions and then subjected to dry press molding into a ring shape to produce a pressed body. Next, in a heat treatment furnace such as a belt furnace, the resin remaining in the pressed body is decomposed and volatilized and then the resultant is sintered at a temperature near the softening point of the sealing material. Thus, a tablet having a predetermined shape may be produced. Further, the sintering may be performed a plurality of times. With this, the strength of the tablet is improved, which facilitates the prevention of deficit, breakage, and the like in the tablet from occurring.

The sealing material is preferably used as a tablet-integrated exhaust pipe obtained by forming the sealing material into a tablet and attaching the tablet to the forward end portion of an exhaust pipe having an enlarged diameter. With this, the need for center positioning of the exhaust pipe and the tablet is obviated, and the operation of attaching the exhaust pipe can be simplified.

In the production of the tablet-integrated exhaust pipe, it is necessary to first performing heat treatment under a state in which the tablet is brought into contact with the forward end portion of an exhaust pipe to bond the tablet to the forward end portion of the exhaust pipe in advance. In this case, a method comprising fixing the exhaust pipe with a jig, inserting the tablet into the exhaust pipe in this state, and subjecting the whole to heat treatment is preferred. The jig for fixing the exhaust pipe is preferably one made of a material that does not cause the fusion of the tablet, such as a carbon jig. Further, the exhaust pipe and the tablet may be bonded at around the softening point of the sealing material for a short period of time, for example, about 5 to 10 minutes.

As the exhaust pipe, $SiO_2$—$Al_2O_3$—$B_2O_3$-based glass comprising a predetermined amount of an alkali metal oxide is suitable, and an FE-2 manufactured by Nippon Electric Glass Co., Ltd. is particularly suitable. This exhaust pipe has a thermal expansion coefficient of $85 \times 10^{-7}/°$ C., an upper temperature limit of 550° C., and dimensions of, for example, an outer diameter of 5 mm and an inner diameter of 3.5 mm. Further, when the diameter of the forward end portion of the exhaust pipe is enlarged, self-supporting stability can be enhanced. In that case, the forward end portion of the exhaust pipe preferably has a flare shape or a flange shape. As a method of enlarging the diameter of the forward end portion of the exhaust pipe, any of various methods may be adopted. In particular, a method comprising heating the forward end portion of an exhaust pipe with a gas burner while rotating the pipe and processing the forward end portion into a predetermined shape with several kinds of jigs is preferred because of excellent mass productivity. FIG. 1 illustrates an example of the tablet-integrated exhaust pipe having this construction. That is, FIG. 1 is a cross-sectional view of the tablet-integrated exhaust pipe, in which the forward end portion of an exhaust pipe 1 has an enlarged diameter and a tablet 2 is bonded to the forward end portion on the panel side of the exhaust pipe.

The tablet-integrated exhaust pipe preferably has the following structure. That is, the forward end portion of an exhaust pipe having an enlarged diameter has attached thereto a tablet and a high melting point tablet, and the tablet is attached on the forward end portion side of the exhaust pipe having an enlarged diameter, and the high melting point tablet is attached on the back end portion side relative to the tablet. Through the adoption of this construction, a contact area with a panel or the like when the exhaust pipe is attached to the panel or the like is larger than in the case of using an exhaust pipe alone. Thus, the exhaust pipe is easily attached to the panel perpendicularly. Further, when the tablet is fixed to the exhaust pipe, the high melting point tablet may be disposed between the tablet and the jig, and hence no special jig is required. As a result, the manufacturing process for the tablet-integrated exhaust pipe can be simplified.

Figure 2:
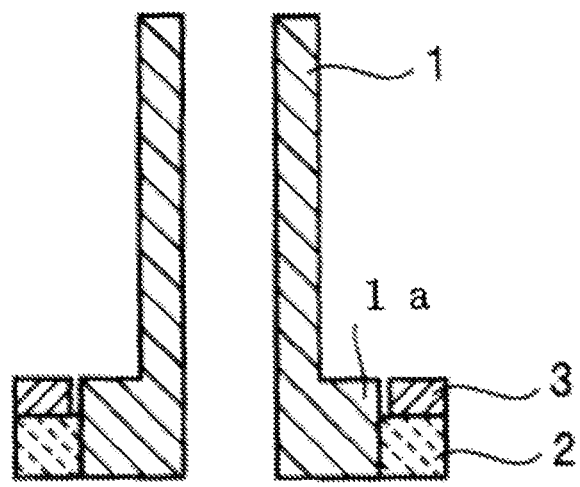
FIG. 2 A cross-sectional conceptual view illustrating a mode of a tablet-integrated exhaust pipe.

In the tablet-integrated exhaust pipe, a construction in which the tablet is bonded to an outer periphery surface of the forward end portion of the exhaust pipe is preferred, and a construction in which the tablet is bonded to only the outer periphery surface of the forward end portion of the exhaust pipe and not bonded to a forward end surface of the forward end portion of the exhaust pipe, i.e., not bonded to a surface to be brought into contact with a panel or the like is more preferred. With this, in a vacuum exhaustion step, a situation in which a constituent component of the tablet flows into the exhaust hole is easily prevented. Further, the high melting point tablet is preferably fixed to the exhaust pipe through the tablet rather than being directly bonded to the exhaust pipe because, in the secondary firing step, the exhaust pipe can be sealed under pressure under a state in which a portion corresponding to the high melting point tablet is fixed with a clip. FIG. 2 illustrates an example of the tablet-integrated exhaust pipe having this construction. That is, FIG. 2 is a cross-sectional view of the tablet-integrated exhaust pipe, in which the forward end portion of the exhaust pipe 1 has an enlarged diameter, and the tablet 2 is bonded to the forward end portion on the outer peripheral surface of a flange portion 1a of the exhaust pipe 1. On the other hand, a high melting point tablet 3 is not bonded to the outer peripheral surface side of the exhaust pipe 1. Further, the tablet 2 is attached on the forward end portion side of the flange portion 1a, and the high melting point tablet 3 is attached on the back end side of the flange portion 1a relative to the tablet 2.

As the high melting point tablet, an ST-4 or FN-13 manufactured by Nippon Electric Glass Co., Ltd. is preferred. A production method for the high melting point tablet is the same as the production method for the tablet described above when the high melting point tablet is made of a glass material. Further, as the high melting point tablet, ceramics, a metal, or the like may also be used.

Next, a second embodiment of the present invention is described. It should be noted that descriptions of matters in common with the first embodiment are appropriately omitted.

A refractory filler according to the second embodiment comprises, as a composition in terms of mol %, 50 to 80% of ZnO, 10 to 40% of $SiO_2$, and 0.1 to 10% of $Al_2O_3$. The reasons why the content range of each component is limited as described above are described below. It should be noted that, in the description of the composition range, the expression "%" means "mol %."

ZnO is a component for precipitating willemite, and its content is 50 to 80%, preferably 60 to 79.9%, particularly preferably 63 to 70%. When the content of ZnO falls outside the range, the precipitation amount of willemite is liable to lower.

$SiO_2$ is a component for precipitating willemite, and its content is 10 to 40%, preferably 20 to 39.9%, particularly preferably 28 to 35%. When the content of $SiO_2$ falls outside the range, the precipitation amount of willemite is liable to lower.

$Al_2O_3$ is a component for enhancing meltability, and its content is 0.1 to 10%, preferably 0.5 to 8%, particularly preferably 1 to 6%. When the content of $Al_2O_3$ is less than 0.1%, the effect of enhancing meltability is poor. On the other hand, when the content of $Al_2O_3$ is more than 10%, vitrification is liable to occur at the time of cooling, and hence a crystal hardly precipitates. Further, the precipitation amount of an Al-based crystal increases, and hence an effect of lowering the thermal expansion coefficient of a sealing material or the like is poor.

In addition to the above-mentioned components, other components may be added within the range of 10% or less.

In the refractory filler, a ratio of willemite to the Al-based crystal is preferably willemite:gahnite=100:0 to 99:1 in terms of molar ratio. When the ratio of the Al-based crystal increases, the effect of lowering the thermal expansion coefficient of a sealing material or the like is liable to lower.

As in the case of the first embodiment, the refractory filler is preferably substantially free of PbO.

As in the case of the first embodiment, the refractory filler has an average particle diameter $D_{50}$ of preferably 20 μm or less, particularly preferably 2 to 15 μm. It should be noted that, in order to allow an effect of the refractory filler to be provided certainly, the average particle diameter $D_{50}$ of the refractory filler is preferably 0.5 μm or more.

As in the case of the first embodiment, the refractory filler has a maximum particle diameter $D_{max}$ of preferably 100 μm or less, particularly preferably 10 to 75 μm.

The refractory filler may be produced by any of various methods. For example, a method comprising firing a raw material batch formed of various oxides in a firing furnace or the like, and then pulverizing the resultant fired body (solid phase reaction method), or a method comprising melting a raw material batch, and then cooling and pulverizing the the resultant melt (melting method) may be adopted. It should be noted that, in a refractory filler produced by the melting method, the following tendencies are stronger than in a refractory filler produced by the solid phase reaction method: an Al-based crystal hardly precipitates; and a thermal expansion coefficient lowers. Therefore, the refractory filler is preferably produced by the melting method. In this case, as a method for the cooling of the melt, any of various methods may be adopted. For example, as in the case of the first embodiment, a method comprising pouring the melt between forming rollers or a method comprising pouring the melt into water is suitable.

As in the case of the first embodiment, the raw material batch preferably has an average particle diameter $D_{50}$ of less than 20 μm. Further, as in the case of the first embodiment, the raw material batch preferably has a maximum particle diameter $D_{max}$ of less than 100 μm.

As a pulverization method (apparatus), the method described in the first embodiment may be similarly utilized.

When the refractory filler has low crystallinity, a heat treatment step at 800° C. or more may be provided separately to enhance the crystallinity of the refractory filler. However, such heat treatment step may cause an increase in cost. Accordingly, it is advantageous to omit such heat treatment step.

The refractory filler is preferably complexed with glass powder and used as a sealing material. That is, a sealing material according to the second embodiment of the present invention is a sealing material comprising glass powder and a refractory filler, in which the whole or part of the refractory filler comprises the above-mentioned refractory filler. As in the case of the first embodiment, the content of the refractory filler in the sealing material is preferably 0.1 to 70 vol %, 15 to 50 vol %, particularly preferably 20 to 40 vol %.

As the glass powder, any of various glass powders may be used. Specifically, as mentioned in the first embodiment as examples, $Bi_2O_3$—$B_2O_3$—ZnO-based glass, $V_2O_5$—$P_2O_5$-based glass, or SnO—$P_2O_5$-based glass is suitable in view of a low melting point characteristic.

The glass powder has an average particle diameter $D_{50}$ of preferably less than 15 μm, 0.5 to 10 μm, particularly preferably 1 to 5 μm.

The sealing material may be used in a powdery state, but is preferably formed into a paste by being uniformly kneaded with a vehicle. The vehicle generally comprises a solvent and a resin. As the resin and the solvent, those described in the first embodiment may be similarly used. Further, a surfactant, a thickener, or the like may also be added as required.

As in the case of the first embodiment, the sealing material according to the second embodiment is preferably used after being sintered into a tablet having a predetermined shape.

EXAMPLES

Example 1

Hereinafter, examples of the first embodiment are described. It should be noted that the following examples are merely illustrative, and the present invention is by no means limited to the following examples.

Table 1 shows examples (Sample Nos. 1 to 4) of the first embodiment and comparative examples (Sample Nos. 5 and 6).

TABLE 1

| | | Example | | | | Comparative Example | |
|---|---|---|---|---|---|---|---|
| | | No. 1 | No. 2 | No. 3 | No. 4 | No. 5 | No. 6 |
| Refractory filler composition (mol %) | ZnO | 66.7 | 66.1 | 65.5 | 64.9 | 66.7 | 50.0 |
| | SiO$_2$ | 33.3 | 32.2 | 31.0 | 29.8 | 33.3 | 0 |
| | Al$_2$O$_3$ | 0 | 1.7 | 3.5 | 5.3 | 0 | 50.0 |
| Production method | | Melting method | Melting method | Melting method | Melting method | Solid phase reaction method | Solid phase reaction method |
| Melting/firing temperature (° C.) | | 1,580 | 1,580 | 1,580 | 1,550 | 1,430 | 1,580 |
| Cooling method | | Forming rollers | Forming rollers | Forming rollers | Forming rollers | — | — |
| Main crystal phase | | Willemite | Willemite | Willemite | Willemite/Gahnite | Willemite | Gahnite |
| Unreacted raw material (unreacted ZnO) | | Absent | Absent | Absent | Absent | Present | Absent |

Sample Nos. 1 to 4 were each produced as follows. First, a raw material batch was produced by blending various raw material oxides so as to have the composition in the table. Next, the raw material batch was loaded into a platinum crucible and melted at the melting temperature in the table for 3 hours. After that, the resultant melt was poured between forming rollers (twin rollers) to cool and form the melt into a film shape. Subsequently, the resultant film was subjected to pulverization with a ball mill and then to classification with a 250 mesh-pass sieve to provide a refractory filler having an average particle diameter D$_{50}$ of 10 μm. In the table, this method was represented as "Melting method."

Sample Nos. 5 and 6 were each produced as follows. First, a raw material batch was produced by blending various raw material oxides so as to have the composition in the table and then pulverizing and mixing the blend with a ball mill for 1 hour. Next, the raw material batch was loaded into an alumina crucible and fired at the firing temperature in the table for 20 hours. Finally, the resultant fired product was crushed and then subjected to pulverization with a ball mill and then to classification with a 250 mesh-pass sieve to provide a refractory filler having an average particle diameter D$_{50}$ of 12 μm. In the table, this method was represented as "Solid phase reaction method."

Each sample was evaluated for its main crystal phase and the presence or absence of an unreacted raw material (mainly ZnO) by XRD. Table 1 shows the results.

As apparent from Table 1, each of Sample Nos. 1 to 4 has willemite or willemite/gahnite precipitated therein as a main crystal phase. Further, an unreacted raw material did not remain therein. On the other hand, Sample No. 5 was produced by the solid phase reaction method, and hence an unreacted raw material remained therein. Further, Sample No. 6 does not have willemite precipitated therein as a main crystal phase, and hence is considered to have a poor effect of lowering a thermal expansion coefficient.

Example 2

Table 2 shows examples (Sample Nos. 7 to 10) of the first embodiment.

TABLE 2

| | | Example | | | |
|---|---|---|---|---|---|
| | | No. 7 | No. 8 | No. 9 | No. 10 |
| Refractory filler composition (mol %) | ZnO | 66.7 | 66.1 | 65.5 | 64.9 |
| | SiO$_2$ | 33.3 | 32.2 | 31.0 | 29.8 |
| | Al$_2$O$_3$ | 0 | 1.7 | 3.5 | 5.3 |
| Production method | | Melting method | Melting method | Melting method | Melting method |
| Melting temperature (° C.) | | 1,580 | 1,580 | 1,580 | 1,550 |
| Cooling method | | Pouring into water | Pouring into water | Pouring into water | Pouring into water |
| Main crystal phase | | Willemite | Willemite | Willemite | Willemite/Gahnite |
| Unreacted raw material (unreacted ZnO) | | Absent | Absent | Absent | Absent |

Sample Nos. 7 to 10 were each produced as follows. First, a raw material batch was produced by blending various raw material oxides so as to have the composition shown in the table. Next, the raw material batch was loaded into a platinum crucible and melted at the melting temperature in the table for 3 hours. After that, the resultant melt was poured into water to cool and form the melt into a crushed shape. Subsequently, the resultant water-granulated product was subjected to pulverization with a ball mill and then to classification with a 250 mesh-pass sieve to provide a refractory filler having an average particle diameter D$_{50}$ of 10 μm. In the table, this method was represented as "Melting method."

Each sample was evaluated for its main crystal phase and the presence or absence of an unreacted raw material (mainly ZnO) by XRD. Table 2 shows the results.

As apparent from Table 2, each of Sample Nos. 7 to 10 has willemite or willemite/gahnite precipitated as a main crystal phase. Further, an unreacted raw material did not remain therein.

Example 3

Hereinafter, examples of the second embodiment are described. It should be noted that the following examples are merely illustrative, and the present invention is by no means limited to the following examples.

Table 3 shows examples (Sample Nos. 11 to 14) of the second embodiment and comparative examples (Sample Nos. 15 to 17).

TABLE 3

| | | Example | | | | Comparative Example | | |
|---|---|---|---|---|---|---|---|---|
| | | No. 11 | No. 12 | No. 13 | No. 14 | No. 15 | No. 16 | No. 17 |
| Composition (mol %) | ZnO | 66.1 | 65.5 | 64.9 | 66.6 | 66.7 | 65.5 | 64.9 |
| | $SiO_2$ | 32.2 | 31.0 | 29.8 | 33.1 | 33.3 | 31.0 | 29.8 |
| | $Al_2O_3$ | 1.7 | 3.5 | 5.3 | 0.3 | 0 | 3.5 | 5.3 |
| Production method | | Melting method | Melting method | Melting method | Solid phase reaction method | Melting method | Solid phase reaction method | Solid phase reaction method |
| Molar ratio "willemite:gahnite" | | 100 0 | 99.3 0.7 | 99 1 | 99 1 | 100 0 | 90 10 | 85 15 |
| Meltability | | good | good | good | — | bad | — | — |
| Melting lower limit temperature | | 1,500 | 1,480 | 1,470 | — | 1,520 | — | — |
| Thermal expansion coefficient [$\times 10^{-7}$/° C.] [30-300° C.] | | 71.6 | 71.7 | 71.9 | 71.8 | 71.5 | 73.1 | 74.2 |

Sample Nos. 11 to 13 and 15 were each produced as follows. First, a raw material batch was produced by blending various raw material oxides so as to have the composition in the table. Next, the raw material batch was loaded into a platinum crucible and melted at 1,580° C. for 1 hour. After that, the resultant melt was poured between forming rollers (twin rollers) to cool and form the melt into a film shape. Subsequently, the resultant film was subjected to pulverization with a ball mill and then to classification with a 250 mesh-pass sieve to provide a refractory filler having an average particle diameter $D_{50}$ of 12 μm. In the table, this method was represented as "Melting method."

Sample No. 14 was produced as follows. First, a raw material batch was produced by blending various raw material oxides so as to have the composition in the table and then pulverizing and mixing the blend with a ball mill for 1 hour. Next, the raw material batch was loaded into an alumina crucible and fired at 1,440° C. for 20 hours. Subsequently, the resultant fired product was crushed and then fired again at 1,440° C. for 20 hours. Finally, the resultant fired product was crushed and then subjected to pulverization with a ball mill and then to classification with a 250 mesh-pass sieve to provide a refractory filler having an average particle diameter $D_{50}$ of 12 μm. In the table, this method was represented as "Solid phase reaction method."

Sample Nos. 16 and 17 were each produced as follows. First, a raw material batch was produced by blending various raw material oxides so as to have the composition in the table and then pulverizing and mixing the blend with a ball mill for 1 hour. Next, the raw material batch was loaded into an alumina crucible and fired at 1,420° C. for 20 hours. Finally, the resultant fired product was crushed and then subjected to pulverization with a ball mill and then to classification with a 250 mesh-pass sieve to provide a refractory filler having an average particle diameter $D_{50}$ of 12 μm. In the table, this method was represented as "Solid phase reaction method."

For each sample, precipitated crystals were identified by XRD, and the peak intensities of the precipitated crystals were measured to calculate a molar ratio between willemite and an Al-based crystal (gahnite). Table 3 shows the results. It should be noted that the XRD was measured with a powder X-ray diffractometer (RINT2100 manufactured by Rigaku Corporation) using X-rays generated from a Cu target at a voltage of 40 kV and a current value of 40 mA in the range of 2θ=10 to 60° at 1°/min. It should be noted that, when the peak intensity of a crystal is 100 cps or less, the peak may be regarded as noise.

Meltability was evaluated as follows. First, a raw material batch was produced by blending various raw material oxides so as to have the composition in the table. Next, the raw material batch was loaded into a platinum crucible and held at 1,500° C. for 30 minutes. After that, when the platinum crucible was taken out, a state in which the raw material batch had completely melted was evaluated as "good," and a state in which the raw material batch remained unmelted was evaluated as "bad."

A melting lower limit temperature was studied as follows. First, a raw material batch was produced by blending various raw material oxides so as to have the composition in the table. Next, the raw material batch was loaded into a platinum crucible and held at increasing temperatures from 1,440° C. in increments of 10° C. for 30 minutes, and the state of the raw material batch was observed at each temperature. The lowest temperature at which the raw material batch completely melted was defined as the melting lower limit temperature.

A thermal expansion coefficient was evaluated as follows. First, glass powder formed of bismuth-based glass was prepared. The glass composition of the glass powder comprised, in terms of mass %, 76.4% of $Bi_2O_3$, 8.1% of $B_2O_3$, 6.4% of ZnO, 5.8% of BaO, 2.2% of CuO, 0.5% of $Fe_2O_3$, and 0.6% of $Sb_2O_3$, and had an average particle diameter $D_{50}$ of about 10 μm. Next, 35 vol % of the refractory filler in the table and 65 vol % of the glass powder were added and mixed, and then fired at 500° C. to provide a dense sintered body. Subsequently, the resultant sintered body was processed into a predetermined shape to produce a measurement sample for push-rod type thermal expansion coefficient measurement (TMA). The TMA was performed with the measurement sample. It should be noted that the measurement was performed in the temperature range of 30 to 300° C.

As apparent from Table 3, each of Sample Nos. 11 to 13 comprised $Al_2O_3$ in its composition, and hence melted at a temperature lower than the melting point of willemite and received a good evaluation in meltability. Further, as the amount of $Al_2O_3$ in the composition increased, the melting lower limit temperature decreased. On the other hand, Sample No. 5 did not comprise $Al_2O_3$ in its composition, and hence did not completely melt until heated to 1,530° C., higher than the melting point of willemite, and received an bad evaluation in meltability.

Further, each of Sample Nos. 16 and 17 had gahnite precipitated therein, an Al-based crystal, and had a ratio of willemite to gahnite of more than 99:1 in terms of molar ratio. Accordingly, the samples each had a high thermal expansion coefficient.

INDUSTRIAL APPLICABILITY

The manufacturing method for a refractory filler according to the present invention is suitable as a manufacturing method for a refractory filler to be used in (1) a sealing material for a display device such as a PDP, an OLED display, an FED, or a VFD, (2) a covering material for a display device such as a PDP, an OLED display, an FED, or a VFD, (3) a sealing material for an electronic component such as a piezoelectric vibrator package or an IC package, (4) a sealing material for cores of magnetic heads or a core and a slider, (5) a sealing material for a solar cell such as a silicon solar cell or a dye-sensitized solar cell, and (6) a sealing material for a lighting device such as OLED lighting.

The invention claimed is:

1. A manufacturing method for refractory filler particles, comprising:
    preparing a raw material batch so that the refractory filler particles comprise, as a composition in terms of mol %, 50 to 80% of ZnO, 10 to 40% of $SiO_2$, and 0 to 10% of $Al_2O_3$;
    melting the raw material batch to obtain a melt; and
    cooling the melt to precipitate willemite as a main crystal phase to obtain the refractory filler particles.

2. The manufacturing method for refractory filler particles according to claim 1, wherein the cooling of the melt comprises pouring the melt between forming rollers.

3. The manufacturing method for refractory filler particles according to claim 1, wherein the cooling of the melt comprises pouring the melt into water.

4. The manufacturing method for refractory filler particles according to claim 1, wherein the raw material batch has an average particle diameter $D_{50}$ of less than 20 μm.

5. The manufacturing method for refractory filler particles according to claim 1, wherein the raw material batch has a maximum particle diameter $D_{max}$ of less than 100 μm.

6. The manufacturing method for refractory filler particles according to claim 1, wherein the willemite and gahnite are precipitated as the main crystal phase.

7. The manufacturing method for refractory filler particles according to claim 6, wherein a ratio of the willemite to the gahnite falls within a range of 99:1 to 70:30 in terms of molar ratio.

8. The manufacturing method for refractory filler particles according to claim 2, wherein the raw material batch has an average particle diameter $D_{50}$ of less than 20 μm.

9. The manufacturing method for refractory filler particles according to claim 3, wherein the raw material batch has an average particle diameter $D_{50}$ of less than 20 μm.

* * * * *